United States Patent

[11] 3,595,192

[72] Inventor Virgilio P. Vega
 8207 Queen Anne's Drive, Silver Spring, Md. 20910
[21] Appl. No. 846,162
[22] Filed July 30, 1969
[45] Patented July 27, 1971

[54] FLOATING CARGO CARRIER
 11 Claims, 10 Drawing Figs.
[52] U.S. Cl.................................................. 114/72,
 114/0.5, 114/235
[51] Int. Cl................................................ B63b 25/00
[50] Field of Search........................................ 114/72-
 —73, 43.5, 74.1, 70, 60, 235, 66.5 F, 5, .5 BD, .5
 D, .5 F, .5 T, 43.5 S, 44, 45, 54, 230; 9/8, 1;
 214/12—14; 108/19, 51, 57; 292/338, 339

[56] References Cited
UNITED STATES PATENTS
2,301,810 11/1942 Phillips......................... 292/338
2,584,884 2/1952 Kirby............................. 9/11
3,065,721 11/1962 Roudabush................... 114/0.5
3,073,274 1/1963 Lamb............................ 114/0.5

*Primary Examiner*—Milton Buchler
*Assistant Examiner*—F. K. Yee
*Attorney*—Raphael Semmes ABSTRACT: A floating cargo carrier ideally useful for loading and unloading cargo on and from ships and waterborne transfer of the cargo. The carrier includes a preferably rigid cargo support platform and an underlying gas inflatable float to buoyantly support the platform and cargo loaded thereon on water. Foldable catwalks are attached to the platform on either side to facilitate, when the catwalks are in a raised horizontal position, cargo handling, and when folded down constituting vertical platform supports and protection means for the float when deflated.

INVENTOR
VIRGILIO P. VEGA
BY Raphael Semmes
ATTORNEY

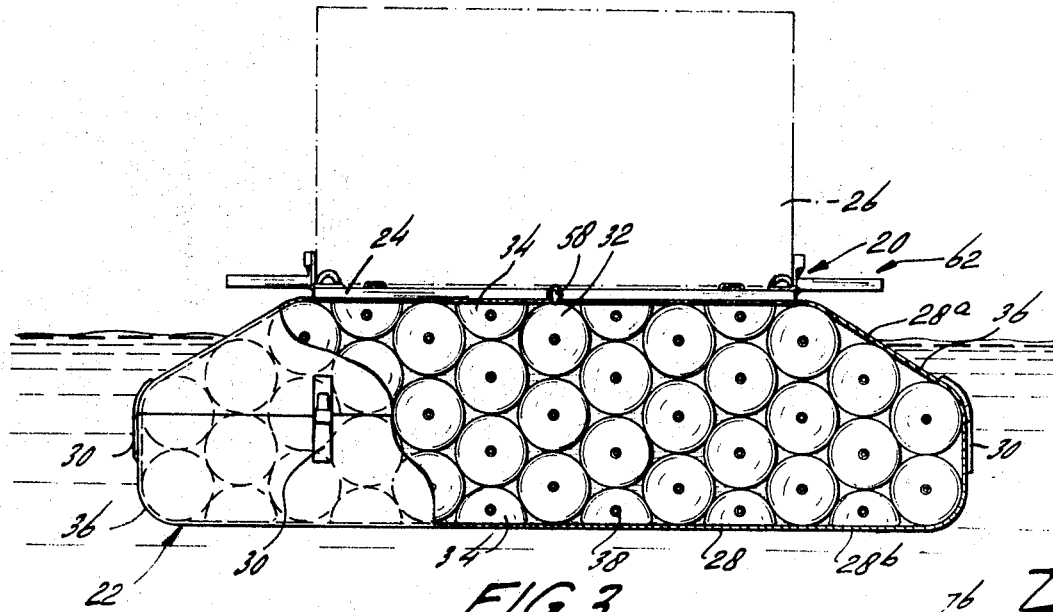
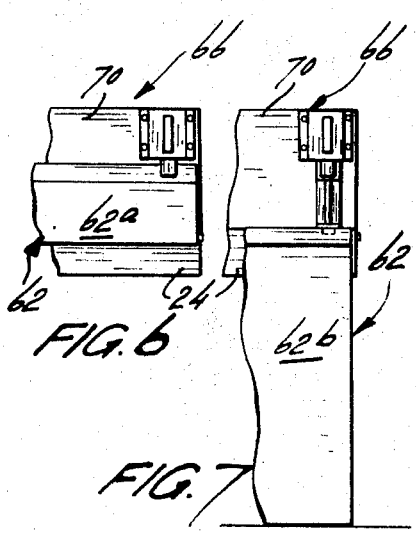
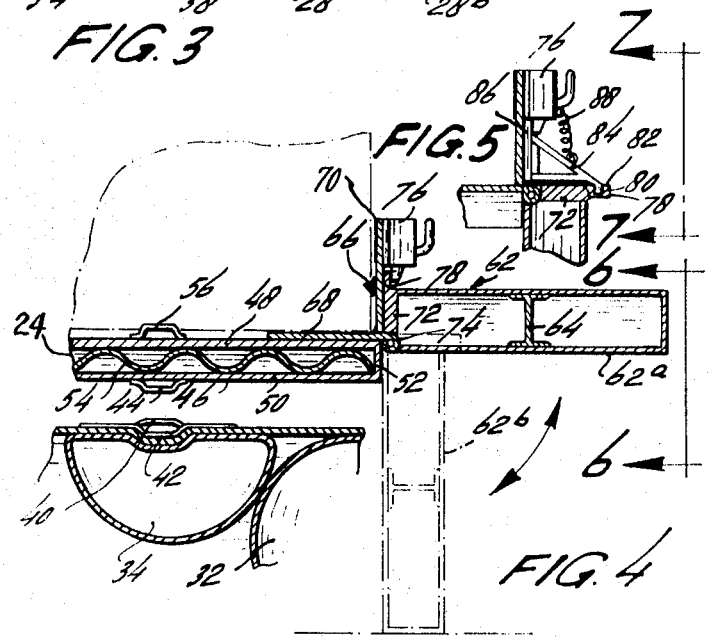
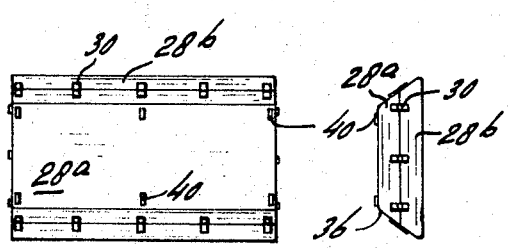
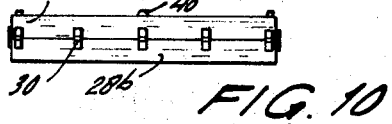

FLOATING CARGO CARRIER

BACKGROUND OF THE INVENTION

Cargo is transported to and from many locations in the world by sea transportation and some areas are devoid of adequate docking or wharving facilities. Such lack creates difficulties in handling and transferring cargo between ship and shore, with attendant increases in time required, costs, and hazards to cargo and personnel. The lack of facilities in some instances seriously affects the feasibility of export-import capabilities in areas otherwise desireable.

SUMMARY OF THE INVENTION

The principal feature of the invention is to provide a floating cargo carrier particularly suitable for loading and unloading cargo on and from ships, and waterborne transfer of the cargo from and to ship and shore. Cargo of any nature is contemplated for use of the invention, and especially prepackaged or containerized cargo, which is becoming more prevalent. The lack of docking or wharfing facilities, by use of the invention, no longer poses such serious drawbacks as to minimize or even preclude delivery or collection of cargo in certain areas throughout the world. The result is obtained by making use of existing waters in an area for seaborne transfer. The structure of the carrier includes a ridge cargo support platform with an underlying inflatable float to buoyantly support the platform with cargo thereon. In order to facilitate cargo handling, foldable catwalks are attached to the platform on either side, which can be raised to horizontal supported position with respect to the platform, for cargo handling personnel use, and lowered to vertical position for supporting the platform on a solid surface such as a ship deck or ground, and also serve when lowered to protect the float when it is deflated.

Other and further objects and advantages of the invention will be more readily apparent from the following detailed description of an embodiment thereof when taken together with the accompanying drawings in which:

FIG. 2 is a perspective view of a plurality of the cargo carriers, disclosing adaptability of disposition on a ship's deck, a dock, land and the like;

FIG. 3 is an end elevational view of the carrier, with float in inflated condition, portions being broken away for clarity;

FIG. 4 is a fragmentary elevational view, in section, through a corner of the carrier disclosing a foldable catwalk construction, and with a float portion in disassembled relationship from the cargo platform;

Figure 1:
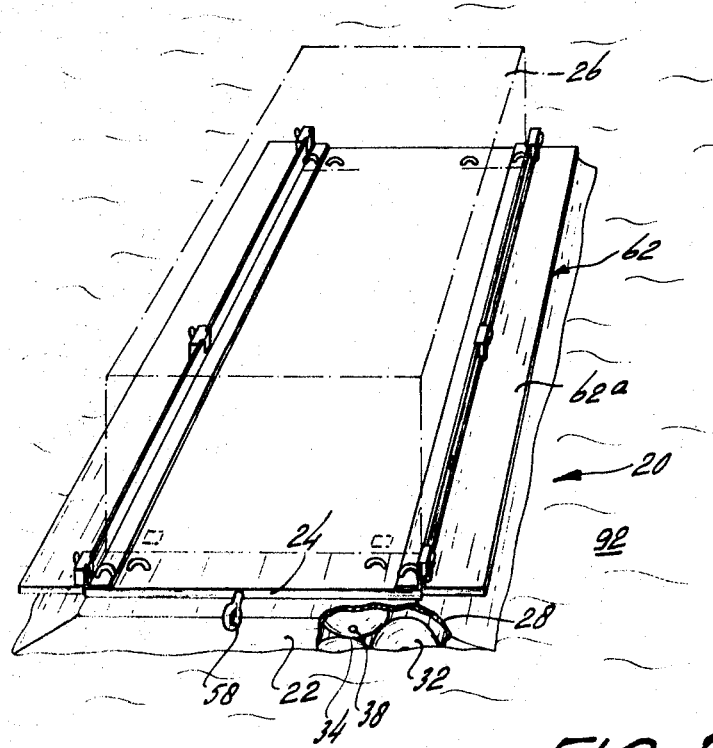
FIG. 1 is a perspective view of a cargo carrier according to the invention, in a waterborne environment of use.

FIG. 5 a fragmentary elevational view, partly in section, showing locking means for a foldable catwalk in vertical platform supporting position;

FIG. 6 is a view along line 6–6 of FIG. 4;

FIG. 7 is a view generally along line 7–7 of FIG. 5;

FIG. 8 is a top plan view of a float embodiment of the invention;

FIG. 9 is an end view taken at right angles FIG. 8; and

FIG. 10 is a side view taken at right angles to FIG. 8.

Referring now in more detail to the drawings, like references indicating like parts, a cargo carrier according to the invention is generally indicated at 20, and includes a buoyant float 22 on which is mounted a cargo platform 24 adapted to support cargo, such as indicated at 26, which can be of any nature with prepackaged or containerized units being suitably convenient.

Float 22 consists of an outer container of case 28 preferably constructed of a sturdy material such as a nylon canvas combination or the like and can, if desired, be rubber lined for additional strength and waterproof properties. The materials can of course vary but preferably are flexible, strong, and relatively impervious to accidental puncturing and deterioration by the elements. The container is preferably formed of two sections, including upper section 28a and lower section 28b, joined and secured by means of belts or straps and buckles, generally indicated at 30.

A plurality of elongated flexible and elastic inflatable air cylinders 32 and half cylinders 34 are arranged in the compartment formed within the container 28. These are longitudinally positioned and extend over the length of the float. The combination and arrangement serves to prevent lateral shifting of air and, when inflated, substantially fill the container interior. The longitudinal corners 36 of container 28 tend to adopt a curvilinear configuration in conformity with the cylinder shape, with the half cylinders permitting substantially planar top and bottom sides. Standard air valves 38 are provided for the cylinders to permit inflation and deflation by any known apparatus for this purpose. The cylinders can be constructed of any known material suitable for their functional use, and in the shown embodiment strength and protection are provided by the nature of the container in relation to the cylinders and to the overall raft.

Buckles 40, or the like, are attached to the top surface of the container in any known manner, and in the depicted form (FIG. 4) provide an open recess 42 to permit interengagement with depending buckles 44 secured to the underside 46 of the platform 24. Connection of the buckles 40 and 44 by means of bolts, pins, belts, straps, and the like, will secure the float 22 and platform 24 to form the basic cargo carrier 20.

Platform 24 is of a generally box shaped configuration, (FIG. 4), including top plate 48, bottom plate 50, side plates 52 and end plates, not shown, with a corrugated reinforcer 54, all of which can be of appropriate material, such as metal, and of required strength characteristics. The buckles 44 can, if metal is used, be welded to underside 46 of bottom plate 50. Cargo securing buckles 56 are attached at desired locations on the upper surface of top plate 48 for cooperation with straps, webs, etc., not shown, to secure the cargo on the platform in a manner to prevent cargo shifting. Tow rings 58 are attached at the longitudinal ends of the platform to facilitate towing of the carrier when waterborne, as will be described hereinafter. Suitable crane connection means 60 can also be secured to the platform for coaction with a crane to lift, move, and lower the carrier as required.

An important feature of the invention resides in the inclusion of foldable catwalks, generally designated 62, which can be of a box-shaped construction (FIG. 4) of metal or the like, and have internal reinforcement such as an I-beam 64. A catwalk is provided on each longitudinal side of the platform and is substantially coextensive therewith. Mounting means for the catwalks include, for example, angle irons 66 having a horizontal leg 68 attached to the top of platform 24 and a vertical leg 70 extending thereabove. Inner end 72 of the catwalk and the angle iron cojointly form a hinge 74 for pivotally mounting the catwalk on the platform to permit raising and lowering of the catwalk into a horizontal position, 62a, and a vertical position, 62b.

Latches 76 of any desired type, such as spring pressed, are attached to vertical leg 70 of angle iron 66 in spaced relation from the upper face of platform 24. The inner end 72 of catwalk 62 has an extended lip 78 thereon. When the catwalk is horizontally positioned, 62a, the lip coacts with latches 76 to lock the catwalk in this position where it provides a support for personnel handling cargo during various work operations. The lip 78 is preferably also provided with a hole 80 for coacting with a depending leg 82 on triangular shaped brackets 84 adapted to lock the catwalk in vertical position (see FIG. 5). The brackets have an extended leg 86 engageable with latch 76 for completion of vertical locking of the catwalk. The brackets are removable from the locking position to permit raising of the catwalks, and can be attached to the latches by nylon cords 88, or the like, to prevent loss when not in use and keep them available for use when required.

Figure 2:
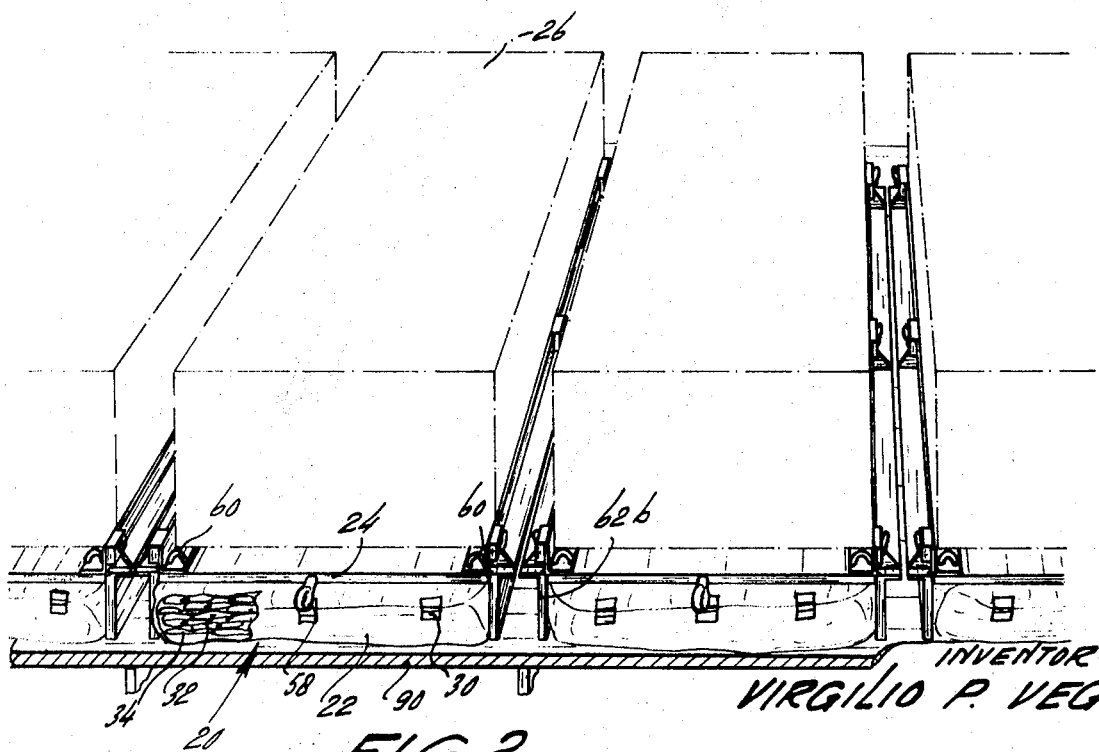

The preferred structure of the invention, as shown and described, will be readily understood from the foregoing. In use, cargo to be transported is loaded on the platform, and preferably covered with a protective covering and strapped to the cargo buckles. When placed on a ship deck 90, (FIG. 2) the float is deflated so that it contracts and is nonrigid. It can then be readily placed under the platform with the catwalks vertical to support the platform thereon, and protectively contain or confine the deflated float, (FIG. 2). When a ship reaches an area where cargo is to be unloaded, a crane, specially designed to lift the platform, raises it in the air, the catwalks are raised to the horizontal position, the inflatable float is filled with air under pressure from any usual source, then the crane deposits the carrier on the water surface 92 (FIG. 1), and personnel insure that the cargo loaded carrier is properly loaded for stability, and cargo properly secured on the platform to prevent shifting of the load or other incidents.

The carrier permits a ship to prepare in advance for unloading while underway. Upon arrival loaded carriers can be quickly deposited on the water, leaving them floating, and the ship can proceed to a subsequent place of delivery. A shipping clerk, or other interested persons, can then attach a small boat to the loaded floating carrier, singly or in a train, and move them to the ultimate destination for unloading.

On a return trip of the ship, local persons can be advised in advance of arrival date, and carriers, loaded or unloaded, can be towed to a deep water rendezvous with the ship. The ship remains away from shore with consequent savings in time for docking and similar expenses. The ship can then load the carriers on the ship with the crane, and before lowering for placement on the deck, air is exhausted from the cylinders so that the float collapses and contracts with a substantial reduction in size. The catwalks are then lowered to the vertical position, with the collapsed float carefully placed and confined under the platform and restricted by the catwalks. The brackets are installed and the carriers then lowered into place on the deck, (FIG. 2), and it is to be noted that the construction and configuration are such as to permit close positioning of the carriers.

Manifestly minor changes can be effected in the invention as shown and described without departing from the spirit and scope thereof as defined in, and limited solely by, the appended claims.

I claim:

1. A cargo carrier comprising a rigid cargo supporting platform having a substantially unobstructed cargo handling upper surface, a fluid buoyant member attached to and underlying said platform and extending lengthwise thereof, said buoyant member including at least one inflatable float, and a catwalk hingedly connected along one longitudinal edge to a longitudinal edge of said platform, said catwalk being swingable downwardly on said hinge connection from a horizontal position parallel with said platform to a vertical position, said catwalk in horizontal position with the buoyant member inflated constituting a personnel support member and, when in vertical position with the buoyant member deflated, constituting an elevating support for said platform and serving to confine and protect the underlying deflated buoyant member.

2. A cargo carrier as claimed in claim 1, said float including an outer container and a plurality of lengthwise extending inflatable cylinders within said container.

3. A cargo carrier as claimed in claim 2, said container and said cylinders being of flexible, resilient and elastic material such that inflation of said cylinders will expand and substantially fill and rigidify said container to form a shaped self-supporting float, and upon deflation of said cylinders said container and cylinders resiliently collapse and retract for confinement under said platform and in a protected position confined by vertically positioned catwalks.

4. A cargo carrier as claimed in claim 3, said cylinders including ones of full round and semi-round shaped cylinders, the latter having flat surfaces thereof juxtaposed to the interior or surfaces of said container, all said cylinders being so nested and disposed as to prevent sideward air shifting with a resultant float of lateral stability.

5. A cargo carrier as claimed in claim 4, said container consisting of separate mating and joinable sections.

6. A cargo carrier as claimed in claim 5, sections including upper and lower half sections, and means for detachably connecting said sections to form a complete container.

7. A cargo carrier as claimed in claim 3, said catwalk being positioned along each lengthwise side of said platform, and with said catwalks in vertical position confining a deflated float therebetween.

8. A cargo carrier as claimed in claim 1, including locking means associated with said platform and said catwalk operable for positively securing said catwalk in a selected horizontal or vertical position.

9. A cargo carrier as claimed in claim 8, said locking means including a latch mounted on said platform, said catwalk having an extension along an edge thereof, said extension, with said catwalk in horizontal position, engaging with said latch for releasable secured horizontal position of said catwalk.

10. A cargo carrier as claimed in claim 9 further including a separate rigid bracket member, a portion of said bracket member, with said catwalk in vertical position, releasably engaging with said latch and a second bracket portion engaging said extension, for releasable secured vertical position of said catwalk.

11. A cargo carrier as claimed in claim 1, said platform including integrated upper and lower rigid plates and an intermediate reinforcement and stiffener, cargo latching buckles on the upper said plate, and coacting float latching buckles on the lower said plate and said float.